June 2, 1970  E. WORMSBECKER  3,514,892
SPREADER FOR FISH JAWS
Filed Dec. 18, 1967
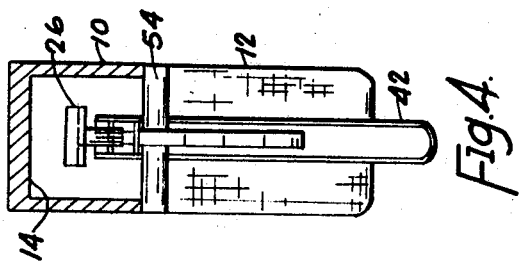
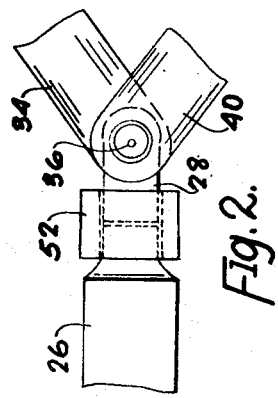
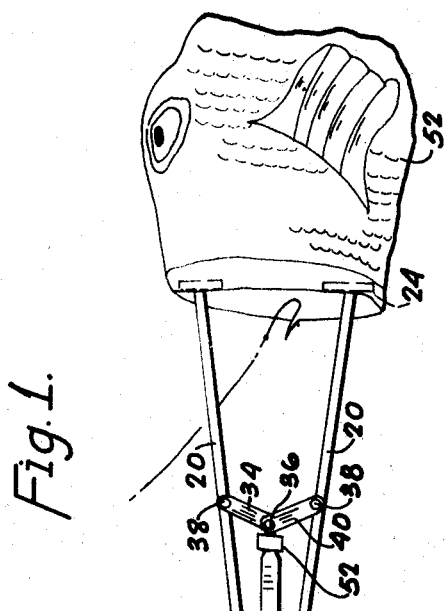
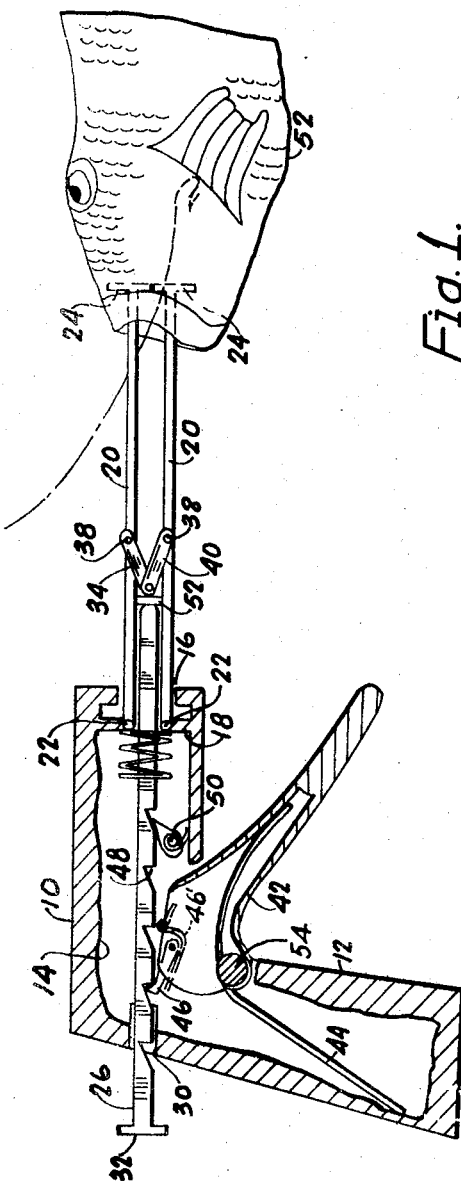
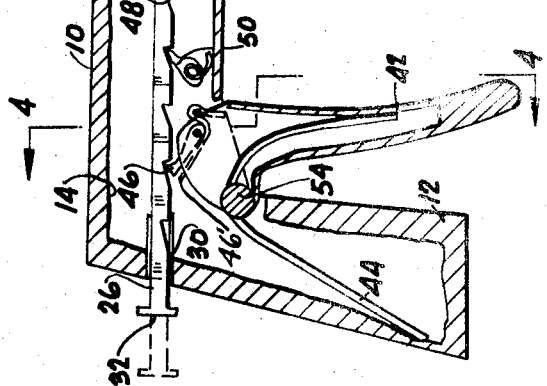
INVENTOR.
EDWARD WORMSBECKER

United States Patent Office 3,514,892
Patented June 2, 1970

1

3,514,892
SPREADER FOR FISH JAWS
Edward Wormsbecker, Box 426,
Towner, N. Dak. 58788
Filed Dec. 18, 1967, Ser. No. 691,445
Int. Cl. *A01k 97/00*
U.S. Cl. 43—53.5                    1 Claim

ABSTRACT OF THE DISCLOSURE

A fish jaw spreader having a housing with a pistol-like grip member projecting laterally therefrom, said housing having an open chamber with an open end. A pair of elongated members project from the housing and are pivotally mounted on the housing. A pair of linkages are provided with one linkage having one end pivotally mounted on one of said elongated members and the other linkage having one end pivotally mounted on said other elongated member, with the other ends of the linkages pivotally connected together. A notched rod is mounted within the housing to pivot the linkage apart and thereby spread the elongated members apart, with the elongated members acting to spread the fish jaws apart. A trigger is mounted on said housing and has means thereon acting to move said rod.

SUMMARY OF THE INVENTON

In my invention, I provide a housing having a hollow chamber with one open end. A pair of spaced apart elongated members extend outward from the chamber, one end of each member being pivotally secured to the housing at the open end. The other end of each member is adapted to be removably inserted into the mouth of a fish.

A manually operated mechanism disposed partially in the chamber and secured to both members at points intermediate their ends can be used to vary the separation between the opposite ends of the members to either spread the jaws of the fish as desired to facilitate removal of the hooks or to permit the jaws to be closed after the hooks have been removed.

BRIEF DESCRIPTION OF THE DRAWINGS

In the drawings:

FIG. 1 is a side view of my invention in preparatory position for use;

FIG. 2 is a detail view of some of the parts thereof;

FIG. 3 is a view similar to FIG. 1 by showing my invention in use; and

FIG. 4 is an end view of my invention as taken through 4—4 in FIG. 3.

DETAILED DESCRIPTION OF PREFERRED EMBODIMENTS

Referring now to FIGS. 1–4, there is shown a pistol-shaped housing 10 having a hollow handle 12 and a hollow chamber 14 with an outer opening 16 and an adjacent restriction 18 having an opening in its center.

First and second elongated bars 20 are each pivotally secured at one end 22 to the periphery of the opening in restriction 18. These bars extend out of opening 16 and terminate at opposite ends in short transverse sections 24.

An elongated rod member 26 extends through the chamber with one end extending through opening 16 and being relatively rotatably connected to a portion 28 of re-

2 duced diameter. FIG. 2 shows the ends of member 26 and portion 28 abutting each other within a sleeve or bearing 52, the connecting means not being shown since such means could be of any conventional type. The other end of member 26 extends rearward through an opposite opening 30 in the housing and has an enlarged head 32.

A first linkage 34 is pivotally secured at one end to a pin 36 extending transversely through portion 28 and is pivotally secured at its other end to one of bars 20 at a point 38 intermediate its ends. A second linkage 40 is pivotally secured in like manner between pin 36 and point 38 intermediate the ends of the other bar 20. A hollow trigger 42 is pivotally mounted to said housing 10 at its pivot point 54 and is spring-urged away from the handle or grip member 12 by leaf spring 44. The leaf spring 44 has one end in the hollow interior of the handle 12 and the other end in the hollow interior of the trigger. The trigger 42 has an arm 46 which is pivotally mounted to the trigger. A leaf spring 46' is mounted on the trigger adjacent the arm 46 to urge the arm 46 into any one of the notches 48 on member 26. A spring-loaded clip 50 can lock into another notch 48. Member 26 is manually rotatable to swing the notches into or out of alignment with the arm 46 and clip 50.

In use, member 26 is rotated until its notches are aligned as shown in FIGS. 1 and 3. Sections 24 are placed in the mouth of a fish. The trigger is pulled several times to advance the member, the linkage 34 and 40 flatten out, increasing the separation between sections 24 and spreading the jaws of the fish 52 as desired. After hooks have been removed, member 26 can be rotated until the notches are out of alignment, and the member 26 can be withdrawn to decrease the separation between the sections 24 and permit the bars 20 to be withdrawn from the mouth of the fish whereby the jaws can be closed.

While I have described my invention with particular reference to the drawings, my protection is to be limited only by the terms of the claim which follows.

Having thus described my invention I claim as new and desire to secure by Letters Patent:

1. A fish jaw spreader device comprising a housing, said housing having a pistol-like grip member extending laterally from said housing, said housing having a hollow chamber with one open end, a pair of elongated members projecting out of said open end of said housing with their inner ends pivotally mounted on said housing and with their outer ends adapted to be inserted into a fish's mouth, a rod slidably mounted through said housing and projecting outward from said open end of said housing between said elongated members and being relatively rotatably connected at its end to an axial extension thereof, said rod having spaced notches disposed along one edge thereof, a pair of linkages with one linkage having one end pivotally connected to one of said elongated members and with the other linkage having one end pivotally connected to the other of said elongated members, said linkages having their other ends pivotally connected together to said axial extension of said slidable rod, said housing having a trigger mounted on said housing and positioned adjacent to said pistol-like grip member and biased away from the grip member by spring means, an arm pivotally mounted on said trigger and urged into engagement with any one of said notches on said rod by other spring means, said trigger being pivotally mounted on said housing whereby the operator may grip said pistol-like grip member and said trigger to pivot said trigger, said pivoted movement of said trigger acting through said arm engaging said notch in said rod to move said rod forward toward said other ends of said linkages to cause said linkages to spread apart thereby spread said elongated members apart with said elongated members thereby spreading apart said jaws of said fish, said rod being rotatable to move the notches out of alignment with said arm to permit said rod to be movably retracted and the elongated members to be withdrawn from the mouth of the fish.

References Cited

UNITED STATES PATENTS

| | | | |
|---|---|---|---|
| 1,952,990 | 3/1934 | Kirsch | 43—53.5 |
| 2,106,577 | 1/1938 | Sherbondy | 222—391 |
| 2,289,810 | 7/1942 | Tallmadge | 43—53.5 |

SAMUEL KOREN, Primary Examiner

D. J. LEACH, Assistant Examiner